United States Patent [19]
Liechty et al.

[11] 3,941,376
[45] Mar. 2, 1976

[54] AUTOMATIC DOCUMENT HANDLER

[75] Inventors: Karl E. Liechty, Pittsford; David C. Lasher, Canandaigua, both of N.Y.

[73] Assignee: Xerox Corporation, Stamford, Conn.

[22] Filed: May 8, 1972

[21] Appl. No.: 250,905

[52] U.S. Cl. .................................. 271/275; 271/4
[51] Int. Cl.² ......................................... B65H 5/02
[58] Field of Search ............ 271/4, 6, 7, 12, 16, 45, 271/46, 47, 48, 49, 50, 275

[56] References Cited
UNITED STATES PATENTS

| | | | |
|---|---|---|---|
| 1,087,121 | 2/1914 | Ielfield | 271/4 |
| 3,025,051 | 3/1962 | David et al. | 271/4 |
| 3,506,257 | 4/1970 | Fackler et al. | 271/4 X |

*Primary Examiner*—Evon C. Blunk
*Assistant Examiner*—Robert Saifer

[57] ABSTRACT

An automatic document handler for supplying documents singly to the platen of a processing apparatus such as a copying machine. Following copying, each document is returned to the document supply where the used documents are kept separated from documents awaiting copying by means of a resettable bail bar. To position the documents properly for copying, the document handler includes a register against which the document trailing edge is abutted through reversal of the platen transport belt. To allow the document to be removed and the platen cleared for the next document, means are provided to remove the register and lower a document deflector into an intercept position, the deflector then serving to guide the document into a predetermined return path back to the document supply without interfering with movement of the next document forward. The platen transport comprises an endless belt conveyor supported for substantially single line contact with the platen surface at a point adjacent to and parallel with the register.

5 Claims, 13 Drawing Figures

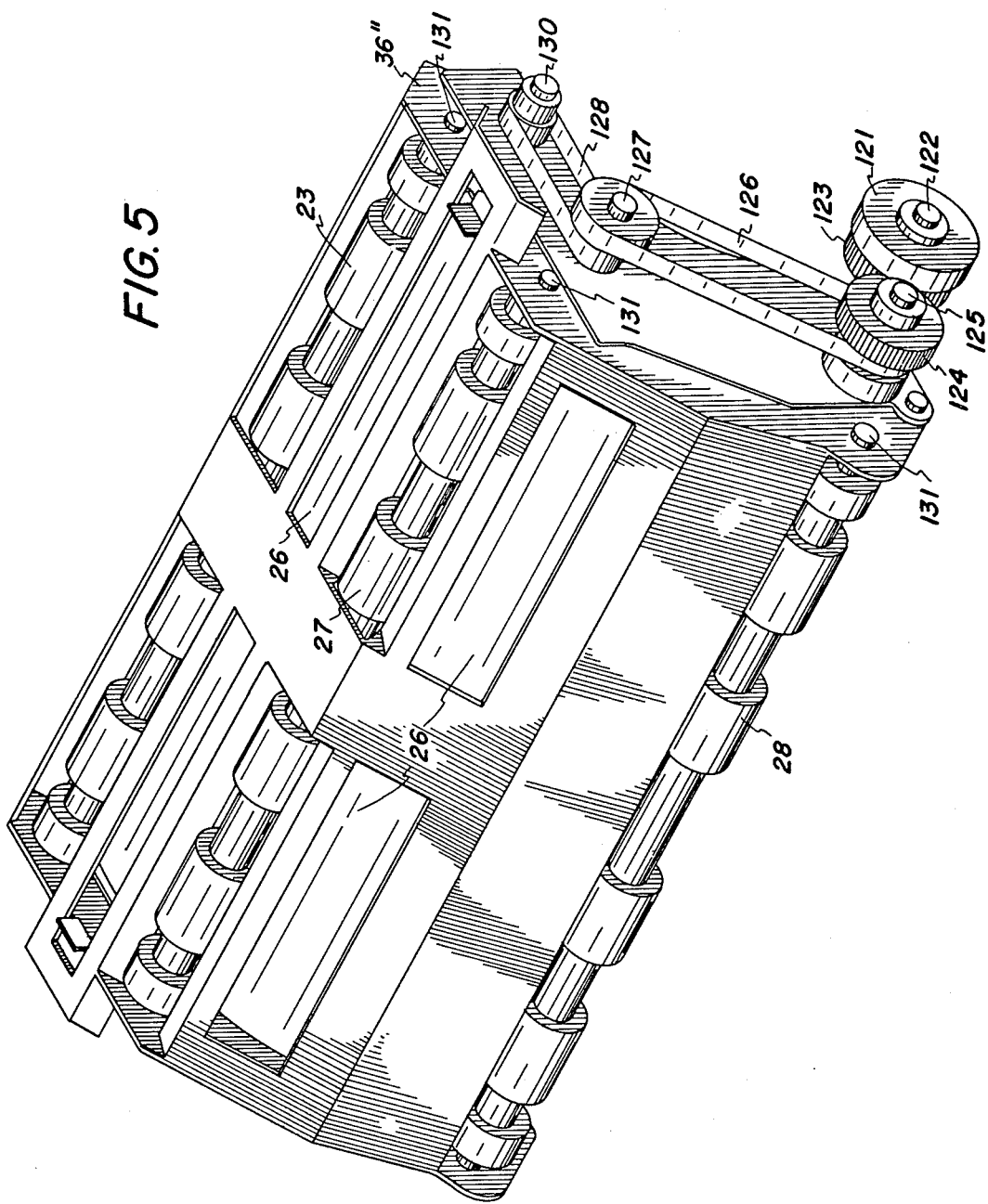

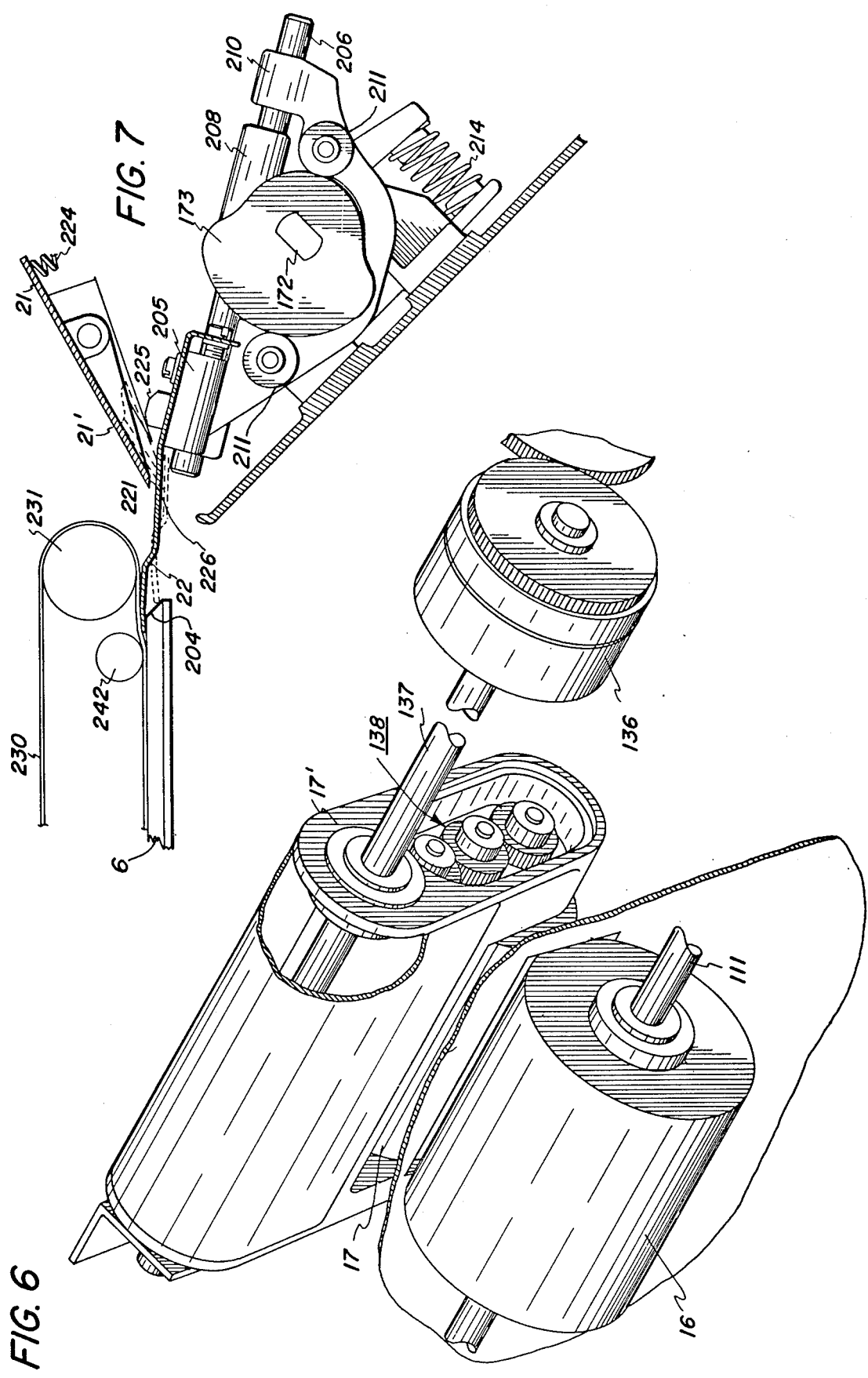

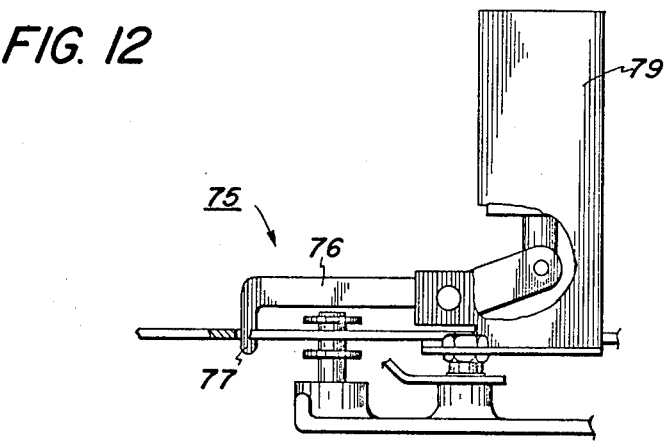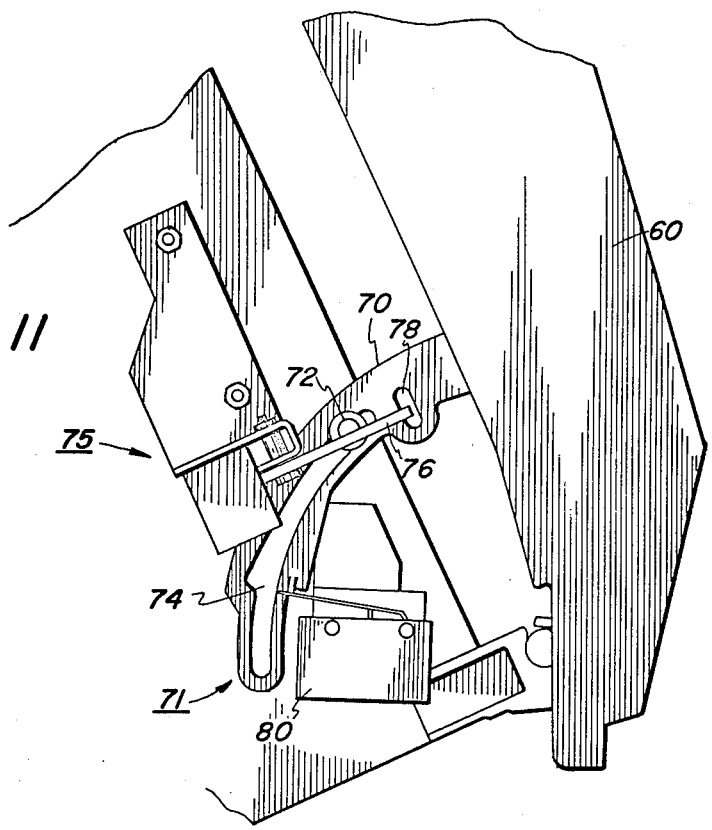

AUTOMATIC DOCUMENT HANDLER

This invention relates to an automatic document handler, and more particularly, to an automatic document handler incorporating an improved transport for moving documents over the platen surface of a processing machine.

In handling, automatically, documents, papers, and the like, which are to be processed as by a copying machine, it is usually required that the document handling device first separate the document to be copied handling device first separate the document to be copied from others awaiting copying. Following this, the document must be brought into position on the machine platen. There, the document is normally located in a certain position, or at least within the confines of a given area to assure the making of a complete and visually acceptable copy.

It is clear, therefore, that if, on completion of this process, the entire document is not on the platen, the copy made may be incomplete. Or, if the document is located in a skewed or canted position on the platen, the copy will reflect, to its detriment, the same skew, or cant. And, if during handling, the original is torn, or creased, the copy will usually bear evidence of this.

On this latter point, it must also be remembered that the original must always be handled with care to avoid tearing, creasing, or other mutilation, or damage thereto. This of course is particularly true where the original is one of a kind. In summary, therefore, any automatic device for handling documents should be capable not only of locating the document properly but also of handling the document without damaging the document. And later, when copying is completed, the document handler should clear the document from the platen in preparation for the next document.

From this discussion, it is believed evident that the design and operation of the platen transport, which serves to move the original onto and off of the platen, is critical if a successful automatic document handler is to be achieved, and problems such as those alluded to earlier are to be avoided.

It is, therefore, a principal object of the present invention to provide a new and improved automatic apparatus for handling documents.

It is an object of the present invention to provide an improved transport for automatic document handlers especially adapted to carry original documents over the platen glass of a document processing machine.

It is a further object of the present invention to provide a platen transport for an electrostatic type copying machine adapted to quickly and reliably move originals into and out of copying position while avoiding damage or mutilation thereof.

It is an object of the present invention to provide an improved low-friction platen transport for the document feeding apparatus of a copying machine.

It is an object of the present invention to provide an improved document transport for use with electrostatic type copying machines adapted to avoid or at least reduce the build-up of static electric charges on the documents as they are moved into and out of copying position.

It is an object of the present invention to provide an improved document transport means for a copying machine arranged to cooperate with a document registering device to locate the document to be copied in a preset copying position and following copying, to clear the document.

This invention relates to a document handling apparatus for bringing documents into copying positon on the platen of a document copying machine for copying purposes, the combination comprising, a flexible document transport belt; a pair of interior support rolls about which the belt is operatively disposed, the support rolls being spaced apart whereby to provide in cooperation with the transport belt a belt operating run opposite to and extending across at least a portion of the platen; means for rotatably supporting each of the rolls so that the surface of the transport belt therearound is spaced slightly above the plane of the platen surface whereby the operating run of the belt would ordinarily be spaced above and out of document driving relationship with the platen; and internal pressure means adapted to force a line of the belt operating run downward toward the platen into document driving relationship with the platen.

Other objects and advantages will appear from the ensuing description and drawings in which:

FIG. 5 is an isometric view showing the drive details for the return document transports of the document handler shown in FIG. 1;

FIG. 6 is an isometric view showing details of the retard roll drive;

FIG. 7 is a side view in cross section showing details of the document register and deflector drive;

FIG. 11 is an enlarged side view showing details of the cover locking mechanism for the document handler shown in FIG. 1;

FIG. 12 is a top view of the cover locking mechanism of FIG. 11; and

Figure 1:
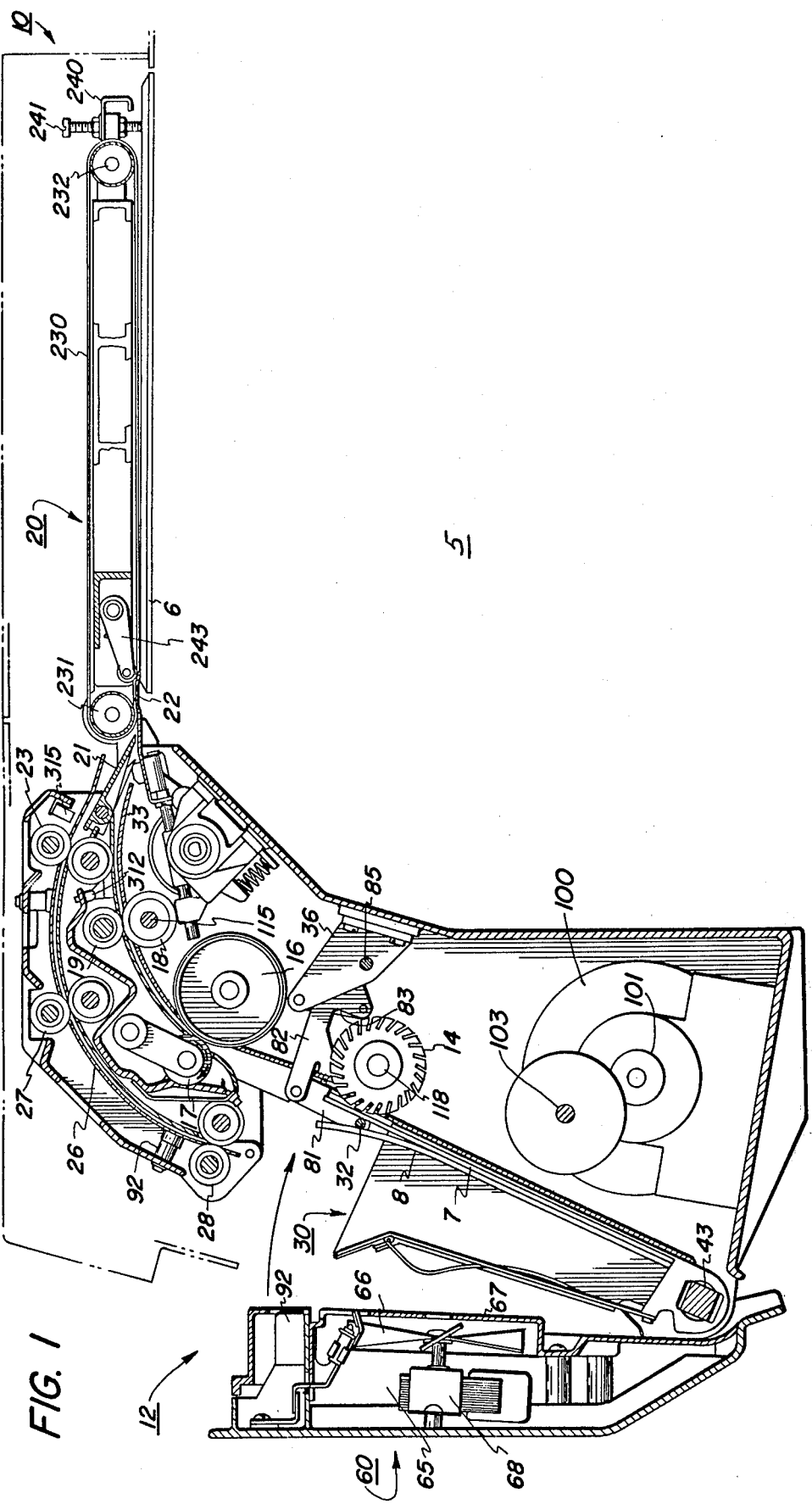
FIG. 1 is a side view in cross section showing a document handler incorporating the improved document transport belt of the present invention in operative association with a document copying machine.

Referring to the drawings, there is shown the document handler, designated generally by the numeral 10 incorporating the platen transport of the present invention. Document handler 10 may be used with any suitable document processing apparatus, such as a copying or reproduction machine 5, which has a platen 6 on which the document to be copied rests.

Document handling apparatus 10 includes a supply tray 12 for storing both documents 7 to be copied and documents 8 already copied. From tray 12, one document at a time is advanced from the bottom of supply 7 by an intermittently operated primary feed roll 14 into the nip of retard roll pair 16, 17. The lower roll 16 is driven in a document feeding direction while the upper roll 17 is driven in the reverse or document reject direction (as shown by the dotted line arrow in FIG. 1) through a suitable slip coupling which normally enables the lower roll 16 to override the reverse drive input to roll 17 and thereby turn roll 17 in the document feeding direction. However, if two or more documents enter the nip of roll pair 16, 17, the reduced friction between the overlapping documents reduces the frictional drive force between roll pair 16, 17, permitting the slip clutch to engage and drive roll 17 in the reverse, document rejecting direction.

The document emerging from retard roll pair 16, 17 passes into the nip of intermediate roll pair 18, 19, and from there underneath deflector plate 21 to platen transport 20. Transport 20, which preferably comprises a belt-type conveyor, first carries the document forward onto platen 6 until the entire document is positioned thereon. Transport 20 is then reversed to bring the document trailing edge against register 22. Register 22 locates the document in copying position following which the copy or copies are made by the copying apparatus 5.

When copying is completed, platen transport 20 is again started in reverse to move the document backwards off platen 6, register edge 22 being previously retracted for this purpose. Deflector 21, which was previously lowered, guides the returning document upwardly into the nip of return roll pair 23. Roll pair 23 move the document along suitable return guides 26 through second and third return roll pairs 27, 28 respectively, and back into tray 12.

To maintain copied documents which have been designated for convenience by the numeral 8, segregated from documents 7 awaiting copying, and prevent inadvertent or premature refeeding of the returned documents 8 by feed roll 14 following feed of the last one of the documents 7, a displaceable bail or separator bar 32 is provided. Bail 32 is disposed substantially opposite to and above primary feed roll 14 to prevent documents resting thereon from contacting roll 14. As will appear, bail 32 may be reset onto the top of the documents in tray 12 when it is desired to refeed the documents to copying machine 5.

Figure 2:
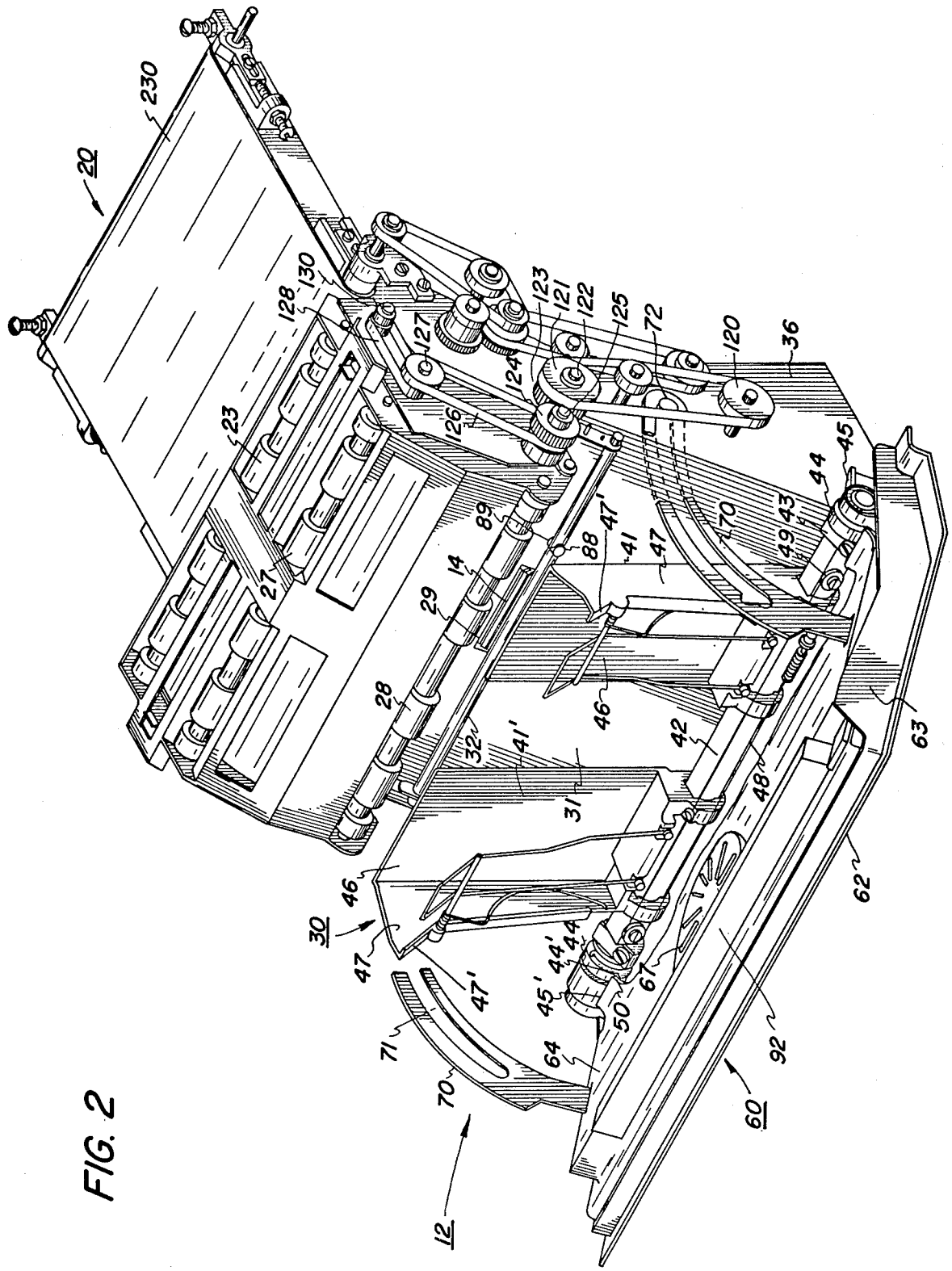
FIG. 2 is an isometric view of the document handler shown in FIG. 1.

Referring now to FIGS. 1 and 2, document tray 12 includes a substantially flat downwardly inclined base 31 and suitable supporting frame 36 carried on copying machine 5 adjacent platen 6. A curved guide 33 leads from base 31 to platen 6, which in the arrangement shown is substantially horizontal. A series of openings 29 in both base 31 and guide 33 accommodate rolls 14, 16 and 18.

As best seen in FIG. 2, a tray assembly 30 is provided for holding the documents, the tray assembly being comprised of matching right and left hand receptacles 41, 41' respectively. Receptacles 41, 41' are arranged in facing relationship to one another and supported by their lower ends on shaft 42, the receptacle supporting segment of which is rectangular in cross section. Shaft 42 is journaled for rotation in bushings 43 on frame 36 adjacent the bottom of base 31. Shaft 42 carries stop collars 44 at each end between bushings 43 and cover supports 45, the latter serving to support tray cover 60 from shaft 42 as will appear. Cover supports 45 each include a drive lug 45' adapted, following predetermined rotation of the cover 60 in the opening direction to engage a mating shoulder 44' on the adjoining collar 44 and thereby drivingly couple shaft 42 and receptacles 41, 41' thereto.

Receptacles 41, 41' each include a base 46 and outer side 47. The upper portion 47' of receptacle sides 47 are preferably flared outwardly to provide a slightly enlarged entrance facilitating entry of returning documents to the tray assembly 30. The relative narrower sides 47 therebelow aid in aligning the document side edges with one another.

Receptacles 41, 41' are preferably supported for lateral adjusting movement along the rectangular portion of shaft 42 toward and away from one another to accommodate various size documents. For this purpose, the receptacles 41, 41' are interconnected adjacent their lower end by means of cord 48. Cord 48 is supported around pulleys 49 with one terminal end thereof secured to one tray 41 and the other to tray 41'. As can be understood, movement of cord 48 effects simultaneous movement of trays 41, 41' toward or away from one another.

Suitable detent means (not shown) may be provided to maintain the receptacles 41, 41' in preselected positions corresponding to conventional document widths. Torsion springs 50 bias receptacles 41, 41' inwardly toward base 31 (in the clockwise direction as seen in FIG. 1), it being understood that contact between base 31 and the bottom 46 of receptacles 41, 41' limits toward movement of receptacles 41, 41'.

To guide returning documents into the receptacles 41, 41' as well as prevent documents from falling out of the receptacles 41, 41', particularly when bail 32 is reset, a cover 60 is provided. As described, cover 60 is rotatably supported from shaft 42 via supports 45 which enable the cover 60 to be swung open for access to the tray assembly 30 during loading and unloading of documents.

Cover 60 includes an exterior wall 62, which may be suitably decorated, depending sides 63, and interior wall 64, which together form a hollow section or plenum 65. As may be seen in FIG. 2, cover 60 is substantially rectangular in shape, and sized to overlay the entire base 31 including the tray assembly 30. Interior wall 64 of cover 60 is substantially flush with the top edge of receptacle sides 47 when cover 60 is closed, the wall 64 serving as a guide to help route returning documents into receptacles 41, 41' as will appear.

A fan 66 is disposed within the cover plenum 65 opposite outlet 67 in interior wall 64. Fan 66 serves to discharge a low pressure stream of air downwardly through outlet 67 onto the documents therebelow in tray assembly 30. Fan motor 68 is housed in the cover plenum 65 and suitable air inlet openings (not shown) are provided in the cover proper for fan 66.

Cover 60 carries a depending detent and stop member 70 on each side thereof, stop members 70 being slotted at 71 to receive guide pins 72 supported from each side of the frame 36. See FIGS. 11 and 12. Slots 71 include an intermediate offset portion 74, offset 74 cooperating with pins 72 to releasably retain cover 60 in a partially open position sufficient to enable documents to be inserted or removed from the tray assembly. Where further access to the tray assembly 30 is required, pins 72 may be released from the offset portions 74, and cover 60 swung open to a maximum open position as defined by the terminal end of slots 71. With such further opening movement of cover 60, shoulders 44', 45' abut to couple shaft 42 with cover 60 so that receptacles 41, 41' are simultaneously turned outwardly to a substantially vertical position.

To prevent premature or inadvertent opening of door 60 while the document handler 10 is operative, a latch mechanism 75 seen best in FIGS. 11 and 12, is provided. Latch mechanism 75 includes a latch 76 having a hook end 77 disposed to engage aperture 78 in one of stop members 70 to thereby prevent opening of cover 60. Suitable spring means (not shown) biases latch 76 toward the unlatched position. A solenoid operator 79 is provided having an armature drivingly connected to latch 76. Solenoid 79 serves, when energized, to swing latch 76 inwardly into latching position. In this circumstance, closure of cover 60 engages latch 76 to prevent reopening thereof until solenoid 79 is deenergized. Solenoid 79 is normally energized during operation of document handler 10.

A switch 80 is provided to prevent inadvertent operation of document handler 10 whenever cover 60 is open. Switch 80 is disposed for actuation by one stop member 70 with closure of cover 60.

Figure 3:
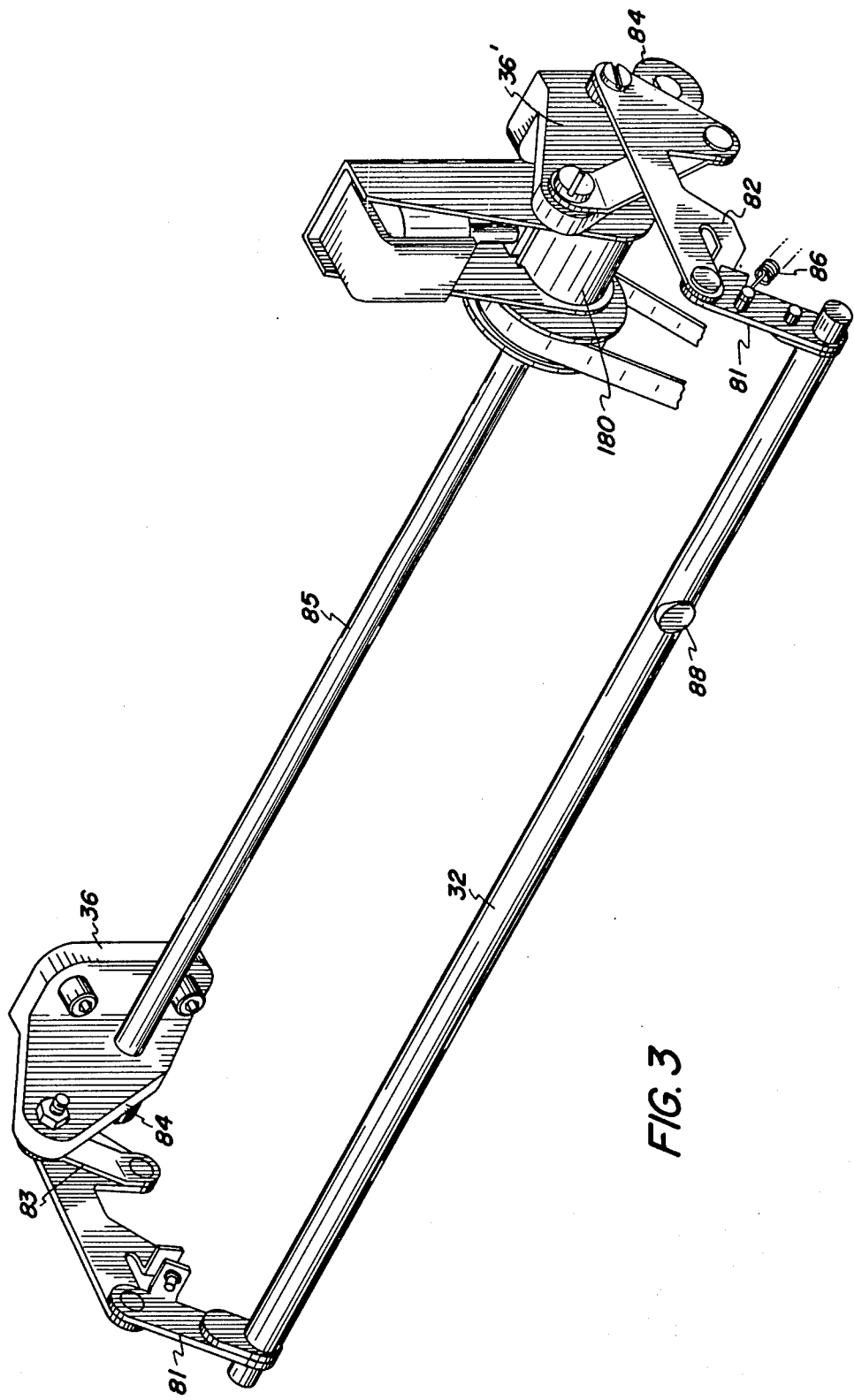
FIG. 3 is an isometric view showing details of the document separating bail.

Referring particularly to FIG. 3, the bail 32 is carried by arms 81 which are in turn pinned to intermediate links 82. Each link 82 is pivotally supported on the frame 36 through an arm 83. Upstanding frame brackets 36' are provided for this purpose, arm 83 being in effect pinned between brackets 36' and link 82. Intermediate links 82 are also pinned to crank arms 84 carried by the transversely extending output shaft 85 of a one revolution clutch 180. As will appear more fully herein, engagement of clutch 180 turns shaft 85 and crank arms 84 through one revolution.

On rotation of crank arms 84, and due to the interrelationship of links 82 relative to supporting arms 82, 83, bail 32 moves through a generally rectangular path, initially in a forward direction generally parallel to tray base 31, then up away from base 31, then back toward primary feed roll 14, and then down toward base 31. With reference to any documents in tray 12 which rest on bail 32, bail 32 moves first forward out from under the documents, then raises up to a position above the documents, then moves back to a position above feed roll 14, and then down onto the topmost document. To provide a predetermined bail pressure, springs 86 are provided to bias arms 81 in a downward direction toward tray base 31.

A photocell type detector 88 is provided on bail 32. A light 89 for detector 88 is located under base 31 and opposite detector 88, base 31 being suitably apertured for this purpose. As will appear, detector 89 responds in certain circumstances to the absence of documents under bail 32 to actuate clutch 180 and reset the bail 32 as described heretofore.

To obviate buildup of static electricity on the documents, a suitable ion generator 92 is provided adjacent the entrance to the document tray assembly 30. Generator 92, which is connected to a suitable source of electrical energy (not shown), serves to ionize the air through which the documents returning to tray assembly 30 pass to help neutralize any static electric charges that may be on the documents.

Figure 4:
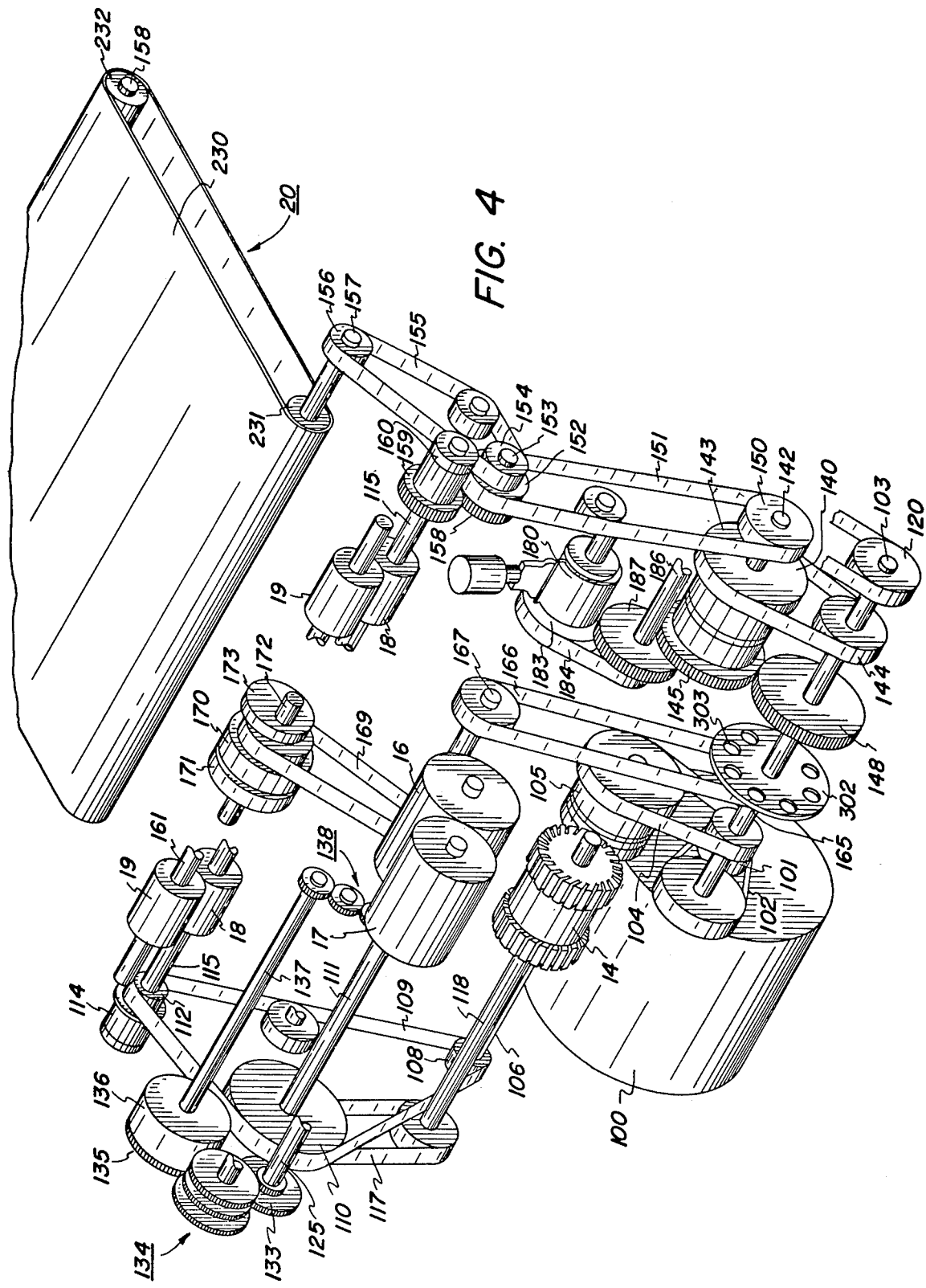
FIG. 4 is an isometric view showing the drive details for the main document transports of the document handler shown in FIG. 1.

Referring now particularly to FIGS. 4–6 of the drawings, a suitable drive motor 100 is provided. Motor 100 may be conveniently supported on frame 36 below tray base 31. Motor shaft 101 is connected by means of toothed belt 102 with main power takeoff shaft 103.

The primary feed roll 14, retard roll pair 16, 17, and lower roll 18 of intermediate roll pair 17, 18 are preferably operated at a lower speed than that of platen belt 20 and return roll pairs 23, 27, 28. To provide such low speed drive to rolls 14, 18 and to roll 16 of retard pair 16, 17, a toothed belt 104 drivingly connects shaft 103 with clutch 105 on transfer shaft 106. As will be understood, clutch 105, when actuated, couples power takeoff shaft 103 with transfer shaft 106.

Transfer shaft 106, which is suitably journaled in frame 36, carries a drive pulley 108 on the outside end thereof. A toothed belt 109 drivingly connects pulley 108 with gear 110 on shaft 111 of the bottom limiting roll 16 and with toothed pulley 112 of overrunning clutch 114. Clutch 114 is supported on shaft 115 of the bottom intermediate transport roll 18 and serves to turn shaft 115 in a document feeding direction unless the high speed drive input to shaft 115 is operational, during which period clutch 114 overruns as will later appear herein.

Primary feed roll 14 is supported by shaft 118 which in turn is suitably journaled in frame 36. Drive belt 117 drivingly connects shaft 118 with limiting roll support shaft 111. As will be understood therefore, actuation of clutch 105 drives primary feed roll 14, lower retard roll 16, and lower intermediate transport roll 18 at low speed in a document feeding direction.

Referring now to FIGS. 1, 4 and 5, power takeoff shaft 103 carries a drive pulley 120 on the terminal end thereof. Pulley 120 is connected with pulley 121 on stub shaft 122. Gear 123 on pulley 121 meshes with gear 124 on shaft 125 supporting the lower rolls of return transport roll pair 28. A toothed belt 126 drivingly connects shaft 125 with shaft 127 supporting the lower rolls of return transport pair 27. A second belt 128 drivingly interconnects shaft 125 with shaft 130 supporting the lower rolls of return transport pair 23. The upper rolls of the return transport roll pairs 23, 27, 28 are supported upon idler shafts 131 suitably journaled in return transport sub-frame 36''.

Referring particularly to FIGS. 4 and 6, shaft 125 carries a gear 133 on the end thereof which, in turn, drives, through intermediate gearset 134, gear 135 of a hysteresis type clutch 136. Shaft 137 of clutch 136 is suitably journaled in transport subframe 36''. As seen in FIG. 6, the retard roll 17 is swingably supported by means of arms 17' from the clutch shaft 137. In addition, gear set 138 drivingly couples clutch shaft 137 with the retard roll 17. As will be understood, therefore, engagement of clutch 136 drivingly couples clutch shaft 137 with driven shaft 125 to turn retard roll 17 via gearset 138 in the reverse or document rejecting direction (shown by dotted arrow in FIG. 6).

Hysteresis clutch 136 is preset to engage whenever the reverse torque applied to shaft 137 generated through contact of roll 16 with retard roll 17, either directly or through the intermediary of one or more documents therebetween, falls below a predetermined level. This normally occurs whenever more than one document at a time attempts to pass between the retard roll pair 16, 17. At other times, clutch 136 is effectively disengaged and retard roll 17 turns with roll 16 in the document feeding direction.

To provide the reversible relatively high speed drive to platen transport 20, a double clutch 140 is provided on an intermediate transfer shaft 142. As will be seen in FIG. 4, one side of clutch 140 carries a forward drive gear 145 coupled to power take off shaft 103 by means of gear 148. The other side of clutch 140 carries reverse drive pulley 143 coupled to shaft 103 via toothed belt 144.

Output pulley 150 on shaft 142 is drivingly coupled by toothed belt 151 with idler gear 152 on stub shaft 153. A second pulley 154 on shaft 153 is coupled by toothed belt 155 with pulley 156 on shaft 157 of platen transport roll 231. Gear 158 on stub shaft 153 meshes with gear 159 of one-way clutch 160 on shaft 115 of lower intermediate transport roll 18. One-way clutch 160 functions to drivingly connect shaft 115 and lower intermediate transport rolls 16 with transfer shaft 142 whenever clutch 140 is engaged in the forward document feeding direction to provide high speed drive to roll pair 18, 19. On engagement of clutch 140 in the reverse feeding direction, clutch 160 disengages to prevent reverse rotation of intermediate transport roll pair 18, 19. The upper intermediate transfer roll 19 is supported on idler shaft 161 suitably journaled in frame 36.

The drive ratios between shaft 103 and the pulley and gear input to clutch 140 are chosen to operate platen transport 20 at a relatively higher speed than that of primary feed roll 14. Since the lower intermediate feed roll 18 is subject to both high and low speed drive input, overrunning clutch 114 additionally serves to accommodate overrunning of roll 18 when both clutches 105 and 140 are simultaneously engaged.

In summary, high speed drive from motor 100 is conducted by clutch 140 in either the forward or reverse direction to platen transport 20. Where clutch 140 is engaged in the forward direction, intermediate feed roll pair 18, 19 are turned at high speed.

Referring particularly to FIG. 4, to operate register edge 22 and deflector 21, power takeoff shaft 103 is drivingly connected by belt 166 with a cross shaft 167. Cross shaft 167 is in turn drivingly connected by belt 169 with the input side of a one-half revolution clutch 170. Clutch 170, which is controlled by a suitable solenoid operator, functions when actuated to turn clutch output shaft 172 through approximately a half revolution as will appear. As seen in FIG. 7, cam 173 on shaft 172 in turn works against follower 210 to move the register edge 22 forward onto platen 6 or backwards off of platen 6. At the same time, deflector 21 is either raised or lowered in response to movement of register edge 22 as will appear hereinafter.

Bail clutch 180 has an input gear 183 drivingly connected by belt 184 with stub shaft 186. Gear 187 on shaft 186 is driven from reverse drive gear 145 through suitable intermediate gears (not shown) designed to drive belt 184 at the proper speed and in the proper direction. Clutch 180 comprises a suitable solenoid actuated one revolution clutch effective when engaged to turn crank arms 84 through one revolution and thereby reset bail 32.

Figure 8:
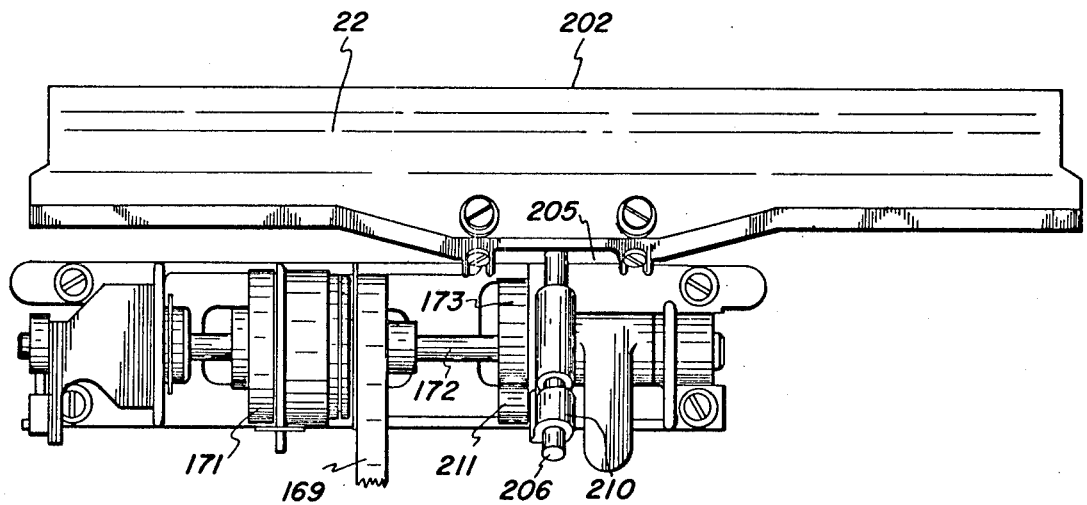
FIG. 8 is a top view of the document register and deflector shown in FIG. 7.

Referring particularly to FIGS. 7 and 8 of the drawings, document register 22 comprises an elongated plate-like part presenting a substantially square registration edge 202 facing platen 6. The width of register 22 is slightly greater than the width of platen 6. Register 22, when viewed in cross section, is slightly concave to conform to the general shape of the platen supporting structure 204. As will appear, edge 202 of register 22 rides up and down on the supporting structure 204 onto and off of the platen 6.

Register 22 is secured to lower support 205. A mounting rod 206 on support 205 is slidably journaled in block 208 which in turn is rotatably mounted on shaft 172 to provide the requisite up and down swinging motion of register 22 about cam shaft 172. A generally U-shaped cam follower 210 is secured to one end of rod 206. Bearings 211 on follower 210 straddle cam 173 such that rotation of cam 173 moves follower 210 together with rod 206 and register 22 back and forth. Spring 214 maintains register 22 against platen 6.

As described heretofore, rotation of cam shaft 172 is controlled by clutch 171, each engagement of clutch 171 serving to rotate shaft 172 and cam 173 through approximately a one-half cycle to advance or retract register 22 onto or off of platen 6.

Return document deflector 21 consists of an elongated plate-like part pivotally supported from the sides of return transport sub-frame 36'' above register 22 such that the forward or leading edge 221 thereof is opposite register 22. Deflector 21 is mounted so that the upper or guiding surface 21' of deflector 21 is in operative alignment with the nip formed by the first return transport roll pair 23. Springs 224 bias reflector 21 downwardly toward register 22 therebelow.

To provide positive raising and lowering movement of deflector 21 in timed relationship with advance and retraction of register 22, register 22 carries a pair of cam-like projections 225 at each outboard end thereof. Cams 225 are disposed to cooperate with deflector 21 so that, with movement of register 22 forward onto platen 6, projections 225 raise edge 221 of deflector 21 to a position above the surface of register 22. This in turn provides a throat-like passage or opening 226 through which the documents may pass unimpeded onto the platen 6.

On retraction of register 22, cams 225 are moved out from under deflector 21 allowing the leading edge 221 thereof to drop into contact with the upper surface of register 22 and closing the document passage 226. The document leaving platen 6 is accordingly routed upwardly by deflector 21 into the nip of first return roll pair 23.

Referring particularly to FIGS. 2, 4, 9 and 10 of the drawings, platen transport 20 consists of an endless flexible belt 230, the outer surface of which is light reflective. One such belt construction is disclosed in U.S. Pat. No. 3,482,676 to G.E. Fackler.

Platen belt 230 is stretched about drive and idler roll pair 231, 232 respectively, rolls 231, 232 being arranged on opposite sides of platen 6 with the axis of roll 231 being above register 22 while that of roll 232 is above the far side of platen 6. Roll shafts 157, 158 are rotatably supported in sides 235, 236 of platen transport 20, sides 235, 236 cooperating with rolls 231, 232 to form a unitary transport sub-assembly. Power shaft 157 is extended in length, the ends thereof being journaled in supports 238 secured on frame 36. This arrangement permits the platen transport 20 to be swung as an assembly about the axis of shaft 157 when single document copying is desired or for servicing platen 6.

Figure 9:
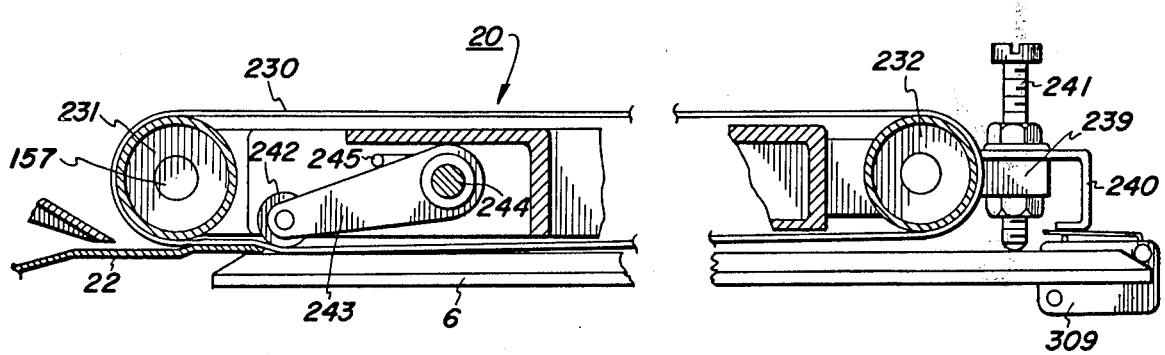
FIG. 9 is an enlarged side view showing the improved document transport belt of the present invention.
Figure 10:
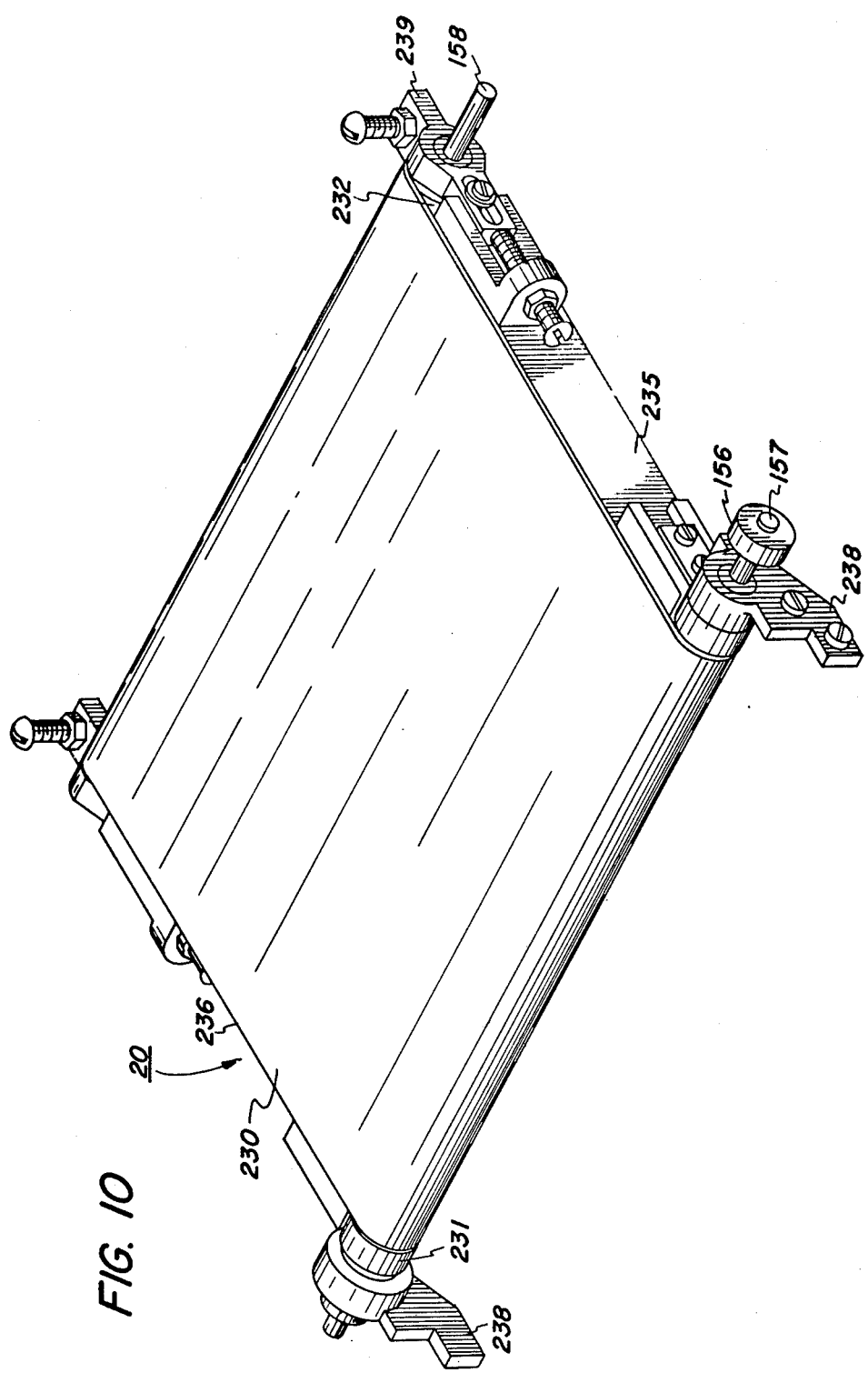
FIG. 10 is an isometric view of the document transport belt shown in FIG. 9.

Power shaft 157 carries pulley 156 which is drivingly connected to motor 100 through forward and reverse clutch 140 as described heretofore. Sides 235, 236 each carry a projection 239 adjacent idler roll 232 cooperable with upstanding spring locks 240 on the platen supporting structure 204 to releasably retain platen 20 in closed position. Adjustable stops 241 are provided to limit downward movement of the platen transport. Suitable safety means, exemplified by switch 309 in FIG. 9, is provided to sense disposition of platen transport 20 in the closed and operative position. Switch 309 serves to prevent operation of the document handler 10 whenever platen transport 20 is raised.

The dimension and mounting of the belt supporting roll pair 231, 232 in sides 235, 236 is such that the surface of platen transport belt 230 therearound is spaced slightly above the level of platen 6 as seen in FIG. 9. An internal pressure roll 242 is provided, roll 242 engaging belt 230 proximate the inlet to platen 6 and slightly downstream of the forward or operating position of register 22. Roll 242 is rotatably supported by end arms 243 which in turn are pivotally carried from cross shaft 244. Shaft 244 is supported by sides 235, 236. Springs 245 bias arms 243 and pressure roll 242 downwardly such that roll 242 forces the portion of belt 230 opposite thereto against platen 6. As a result, a line-like portion of the platen transport belt 230 adjoining register 22 normally rides against the surface of platen 6 to assure driving contact of belt 230 with the documents and engagement of the document edge with register 22. The adjoining portions of platen belt 230 slope upwardly away from platen 6 to reduce or minimize frictional drag between the belt 230 and the surface of platen 6. This in turn not only reduces power requirements but also the tendency of static electric charges to build up on the documents.

Figure 13:
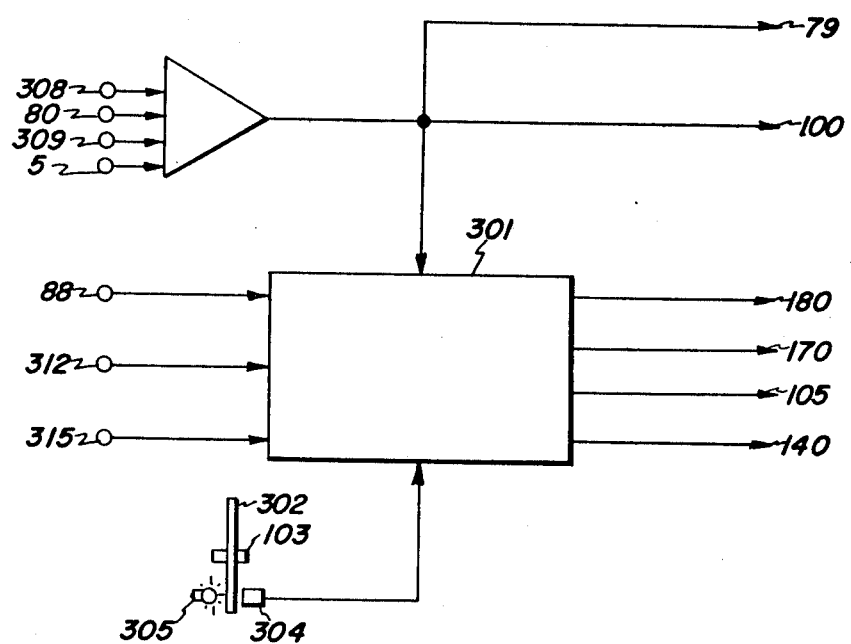
FIG. 13 is a control schematic for the document handler shown in FIG. 1.

In FIG. 13 of the drawings, a control arrangement for the document handler 10 is there schematically shown. In that arrangement, a suitable controller 301 is provided to integrate operation of the various components of the document handler with each other and with the apparatus with which document handler 10 is used such as copying apparatus 5. To provide the requisite timing intervals controller 301 includes a suitable timing or counting device (not shown) driven by means of clock disc 302 on power transfer shaft 103, there being a suitable signal generator here shown as photocell 304, and light source 305 disposed on opposite sides of disc 302. Note FIG. 4. Apertures 303 in disc 302 permit light from light source 305 to intermittently strike photocell 304 as disc 302 rotates to provide a clocklike input pulse.

Starting and stopping of document handler motor 100 may be conveniently effected by means of a suitable manually operated start-stop control 308. In the arrangement shown, operation of the document handler 10 is dependent upon enabling signals from copying machine 5, tray cover safety switch 80 and platen transport safety switch 309, respectively. Switches 80, 309 reflect disposition of tray cover 60 and platen transport 20 in their closed operating positions. It is understood that other contingency controls may be provided.

In operation, and referring particularly to FIGS. 1, 4 and 13, the documents 7 to be copied are placed in tray assembly 30 trailing edge down, the document or documents resting atop bail 32. It is understood that receptacles 41, 41' are adjusted for proper document size.

With stop-start control 308 actuated and platen transport 20 lowered, closing cover 60 starts document handler motor 100. It is understood that return transport roll pairs 23, 27, 28, which are directly coupled to motor 100, are driven whenever motor 100 is energized. Further, latch solenoid 79 is energized to engage latch mechanism 75 and lock cover 60 in closed position.

At start-up, detector 88 on bail 32 signals the absence of documents therebelow. In response thereto, controller 301 engages bail clutch 180 to move bail 32 through one cycle from a position below the documents in tray 12 to a position on top of the documents in the manner explained heretofore.

With bail 32 properly positioned atop the documents 7 in tray assembly 30, controller 301, in response to the document demand signal of wait station detector 312 at the entrance to platen 6, actuates clutch 105 to drivingly couple primary feed roll 14, retard roll pair 16, 17 and intermediate feed roll pair 18, 19 with motor 100. Rotation of feed roll 14 advances the bottommost document in tray 12 forward through retard roll pair 16, 17 which guard against feeding of double sheets, and into the nip of intermediate roll pair 18, 19 operating at low speed.

As the leading edge of the first document moves out of roll pair 18, 19 and comes opposite detector 312, controller 301 actuates clutch 140 to couple gear 145 to drive shaft 142 and thereby operate intermediate feed roll pair 18, 19 and platen transport 20 in the forward direction to advance the waiting document onto platen 6. It is understood that engagement of clutch 140 in the document forward feed direction drives intermediate feed roll pair 18, 19 at high speed, overrunning clutch 114 accommodating the difference in driving input speed in the event primary feed clutch 140 is engaged.

Following a predetermined interval sufficient to allow the trailing edge of the document to pass over and slightly beyond the register 22, controller 301 switches clutch 140 from forward to reverse drive, the latter coupling drive pulley 143 with shaft 142.

Platen transport 20 is therefore reversed and the document moved backwards on platen 6 until the rear or trailing edge thereof abuts against register 22. Abutment of the document edge with the edge 204 of register 22 locates the document in predetermined copying position. With document movement prevented by register 22, belt 20 slides across the document surface until clutch 140 is disengaged. It is understood that one-way clutch 160 prevents reversing of intermediate feed roll pair 18, 19 upon reversing of platen transport 20.

Platen transport 20 is operated in reverse by controller 301 for an interval sufficient to allow transport 20 to bring the document trailing edge against register 22, at which point clutch 140 is disengaged and platen transport 20 stopped. With the document in copying position, copying apparatus 5 is then enabled to begin the copying cycle.

As the trailing edge of the first document moves past wait station detector 312, controller 301 again engages clutch 105 in response to the demand signal from detector 312. Rolls 14; 16, 17; and 18, 19 are therefore operated to bring the next or second document forward as explained heretofore. When the leading edge of that document reaches detector 312, controller 301 disengages clutch 105 to prevent feeding of another document. At this point therefore, the first document is in copying position on platen 6 while the second document is in a waiting position adjoining the inlet to platen 6.

On completion of the copying cycle, controller 301 actuates register drive clutch 170 to retract register 22 and lower deflector 21. When retraction of register 22 and lowering of deflector 21 has been completed, controller 30 actuates clutch 140 in the reverse drive mode to couple belt 144 with shaft 142. Platen transport 20 is therefore driven in reverse to move the document off platen 6. As the document moves off of the platen, deflector 21 routes the document into the nip of first return transport roll pair 23. Roll pair 23 cooperate with return guides 26 and roll pairs 27, 28 to carry the document back to tray 12 where the document is deposited into receptacles 41, 41' atop bail 32.

As the trailing edge of the returning document passes a return document detector 315, controller 301 actuates register drive clutch 170 to bring register 22 forward to registering position on platen 6. At the same time, deflector 21 is raised. With register 22 in position, controller 301 actuates clutch 140 in the forward drive mode to couple gear 145 with shaft 142 and operate intermediate feed roll pair 18, 19 and platen transport 20 in the document feeding direction at high speed. Actuation of feed roll pair 18, 19 and transport 20 moves the waiting document onto platen 6 and into registered position as described heretofore. And, with advance of the next document forward from the waiting station, controller 301, in response to the demand signal from detector 312, engages clutch 105 to bring the next document forward from tray assembly 30 into waiting position as described.

The aforedescribed cycle of operation continues until the last document is fed from under bail 32. On that event, controller 301, in response to a signal from the document detector 88 on bail 32, engages clutch 180 to reset bail 32 as described.

At this point, the last of the documents originally placed in tray assembly 30 is normally at the waiting station defined by detector 312. If bail 32 is to be restored to its original position atop the last document of the document supply, the bail must be reset again after the last document is returned to the tray assembly 30. To effectuate this, controller 301, on a last document signal from copying machine 5 and following the elapse of a predetermined time interval adequate to allow the last document to reach tray assembly 30, again actuates bail clutch 180 to reset bail 32.

In cases where a single document cycle is desired, resetting of bail 32 may be omitted to facilitate removal of the documents from tray 12. Similarly, resetting of bail 32 may be omitted on the last cycle of a multiple copy cycle for this purpose.

While the invention has been described with reference to the structure disclosed, it is not confined to the details set forth, but is intended to cover such modifications or changes as may come within the scope of the following claims.

What is claimed is:

1. In a document handling apparatus for bringing documents into copying position on the platen of a document copying machine, the combination of:
   a flexible document transport belt;
   a pair of interior support rolls about which said belt is operatively disposed, said support rolls being spaced apart whereby to provide in cooperation with said transport belt a belt operating run opposite to and extending across at least a portion of said platen;
   means for rotatably supporting each of said rolls so that the surface of said transport belt therearound is spaced slightly above the plane of said platen whereby said belt operating run would ordinarily be spaced above and out of document driving relationship with said platen; and
   internal pressure means adapted to force a line portion of said belt operating run downward toward said platen into document driving relationship with said platen.

2. The apparatus according to claim 1 in which said internal pressure means includes a pressure roll interiorly of said belt engageable with the inside wall of said belt operating run.

3. The apparatus according to claim 1 in which said internal pressure means includes spring means to bias said pressure roll toward said platen.

4. In an apparatus for supporting a document transport belt of an automatic document handling device adapted for use with a copying machine having a relatively flat platen surface on which the document to be copied is positioned for copying purposes, the combination of:
   internal roller means for supporting said belt therearound such that an operating run of said belt is stretched across said platen surface, said roller means including at least one belt support roller adjacent the side boundaries of said platen surface with said belt operating run extending therebetween across said platen surface;
   means for rotatably supporting each of said belt rollers in substantially parallel relationship such that the surface of said belt riding against the periphery of said rollers is spaced slightly above the plane of said platen surface; and
   at least one pressure roller disposed opposite said platen surface between said support rollers for contact with said belt operating run to force the portion of said belt riding thereagainst downwardly toward said platen surface and into document driving engagement therewith, the axis of said pressure roll being substantially parallel with the axes of said belt support rollers.

5. The apparatus according to claim 4 in which said copying machine includes abutment means raised above the plane of said platen surface against which an edge of the document to be copied is engaged whereby to register the document in position on the platen surface, said abutment means being disposed between said belt support rollers;
   said pressure roller being spaced adjacent said abutment means to assure engagement of the document edge with said abutment means.

* * * * *